(12) United States Patent
Abe et al.

(10) Patent No.: US 6,584,843 B2
(45) Date of Patent: Jul. 1, 2003

(54) GYROSCOPE AND INPUT UNIT USING THE SAME

(75) Inventors: Munemitsu Abe, Miyagi-ken (JP); Masayoshi Esashi, Miyagi-ken (JP)

(73) Assignees: Alps Electric Co., Ltd., Tokyo (JP); Masoyoshi Esashi, Miyagi-ken (JP)

( * ) Notice: Subject to any disclaimer, the term of this patent is extended or adjusted under 35 U.S.C. 154(b) by 48 days.

(21) Appl. No.: 09/862,554

(22) Filed: May 22, 2001

(65) Prior Publication Data

US 2001/0047687 A1 Dec. 6, 2001

(30) Foreign Application Priority Data

May 29, 2000 (JP) .......................................... 2000-159073

(51) Int. Cl.[7] .................................................. G01P 9/04
(52) U.S. Cl. ..................................... 73/504.16; 310/370
(58) Field of Search ........................ 73/504.04, 504.12, 73/504.16, 504.02; 310/370, 321

(56) References Cited

U.S. PATENT DOCUMENTS

| 4,381,672 A | 5/1983 | O'Connor et al. | |
| 4,628,734 A | 12/1986 | Watson | |
| 5,451,828 A | 9/1995 | Tomikawa et al. | |
| 5,821,420 A | * 10/1998 | Cho et al. | ................ 73/504.16 |
| 6,439,052 B1 | * 8/2002 | Abe et al. | ................ 73/504.16 |

FOREIGN PATENT DOCUMENTS

| EP | 1083404 | * 3/2001 |
| EP | 1099930 | * 5/2001 |

* cited by examiner

*Primary Examiner*—Helen Kwok
(74) *Attorney, Agent, or Firm*—Brinks Hofer Gilson & Lione

(57) ABSTRACT

A gyroscope includes a tuning fork, which includes a plurality of tines formed of a conductive material and a supporting portion; an upper glass substrate and a lower glass substrate which sandwich the tuning fork; drive electrodes which are provided on each of the upper and the lower glass substrates in such a manner that parts of the drive electrodes oppose the tines and the remaining parts protrude from the tines, the drive electrodes being capacitively coupled to the tines and driving the tines in a direction parallel to the substrates; and detection electrodes which are capacitively coupled to the tines, and which detect displacements of the tines in a direction perpendicular to the vibrating direction of the tines.

14 Claims, 12 Drawing Sheets

GYROSCOPE AND INPUT UNIT USING THE SAME

BACKGROUND OF THE INVENTION

1. Field of the Invention

The present invention relates to gyroscopes and input devices using the gyroscopes. More specifically, the present invention relates to a gyroscope in which displacements of the tines of a tuning fork, which occur when an angular velocity is applied, are detected by using variations in capacitances, and to an input device using the gyroscope.

2. Description of the Related Art

Conventionally, gyroscopes in which a tuning fork formed of a conductive material such as silicon, etc., is used are known. In these types of gyroscopes, the tines of the tuning fork are vibrated in one direction, and vibrations thereof in the direction perpendicular to this direction, which occur due to Coriolis force when an angular velocity about the central axis parallel to the longitudinal direction of the tines is input, are detected. The vibrations which occur due to Coriolis force correspond to the angular velocity applied. Thus, the gyroscopes may be used as angular velocity sensors, and may be used in, for example, coordinate input devices for personal computers.

FIG. 15 is a schematic diagram showing a construction of a conventional gyroscope, which is disclosed in Japanese Unexamined Patent Application Publication No. 11-311520 which is assigned to the present assignee. As shown in FIG. 15, a gyroscope 100 includes a tuning fork 103 having three tines 101 and a supporting portion 102 which connects base ends of the tines 101. The tuning fork 103 is formed of silicon which has electric conductivity. The supporting portion 102 is fixed on a substrate 104 formed of a glass, and drive electrodes 105a, 105b, 105c, and 105d, which are also formed of silicon, are disposed between and the tines 101 and outside the tines 101 at both ends. The drive electrodes 105a and 105c are electrically connected with each other, and the drive electrodes 105b and 105d are also electrically connected with each other. An alternating voltage having opposite phases is applied to the pair of drive electrodes 105a and 105c and to the pair of the drive electrodes 105b and 105d. Accordingly, electrostatic attractions occur when the voltage is applied to the drive electrodes 105a to 105d, and each of the tines 101 is vibrated in a direction parallel to the surface of the substrate 104. This direction will be referred to as the lateral direction in the descriptions hereof.

In the gyroscope 100, when an angular velocity about an axis parallel to the longitudinal direction of the tines 101 is input while the tines 101 vibrate in the lateral direction, vibrations of the tines 101 in the direction perpendicular to the substrate 104 occur. This direction will be referred to as the thickness direction in the descriptions hereof. The vibrations of the tines 101 in the thickness direction are detected by detection electrodes 106, which are disposed under the tines 101. The detection electrodes 106 are formed on the substrate 104 as metal films of chromium, etc. When the tines 101 vibrate in the thickness direction, the gaps between the tines 101 and the detection electrodes 106 vary, so that electrostatic capacitances between the tines 101 and the detection electrodes 106 also vary. Therefore, by obtaining the variations of electrostatic capacitances in terms of electric signals, the input angular velocity may be determined.

Generally, there are two types of such gyroscopes. In one type, which is referred to as a lateral direction driving type, the tines are driven in the lateral direction, and vibrations thereof in the thickness direction are used for the detection. In the other type, which is referred to as a thickness direction driving type, the tines are driven in the thickness direction and the vibrations thereof in the lateral direction are used for the detection. The gyroscope 100 shown in FIG. 15 is of the former type.

In the gyroscopes having the above-described construction, the drive electrodes are disposed at both sides of each of the tines. Thus, gaps between the tines cannot be made sufficiently small. More specifically, when the width of the drive electrodes is $x_1$, and the gap between the drive electrodes and the tines is $x_2$, the gap G between the tines is calculated as $G=x_1+2x_2$. There are limits determined by silicon processes using typical technologies for manufacturing semiconductor devices regarding the amounts by which $x_1$ and $x_2$ can be reduced. Accordingly, there is also a limit to how much the gap G between the tines can be reduced.

On the other hand, it is known that in three-tine type tuning forks, a "Q value", which indicates a degree of resonance in devices such as tuning forks, may be increased by reducing the gap G between the tines. When the Q value is increased, efficiency at which electric energy input to the device is converted into vibration energy is improved. Thus, in the lateral direction driving type gyroscope, a large driving force can be obtained using a small driving voltage. Therefore, the driving voltage can be reduced.

As described above, it is expected that various advantages can be obtained by reducing the gap between the tines; for example, the size of the device and the driving voltage can be reduced. In the conventional gyroscope, however, there is a limit to how much the gap between the tines can be reduced, and it has not been possible to achieve a reduction of the gap.

SUMMARY OF THE INVENTION

Accordingly, it is an object of the present invention to provide a low-cost, lateral direction driving type gyroscope in which the above-described various effect can be obtained, and an input unit using the gyroscope.

In order to attain the above-described object, according to an aspect of the present invention, a gyroscope includes a tuning fork having vibrating beams; a pair of substrates which are disposed one at each side of the tuning fork, at least the surfaces thereof being insulative; drive electrodes which are provided on each of the substrates in such a manner that parts of the drive electrodes oppose the vibrating beams and the remaining parts of the drive electrodes protrude from the vibrating beams, the drive electrodes being capacitively coupled to the beams and driving the vibrating beams in a direction parallel to the substrates; and detection electrodes which are capacitively coupled to the vibrating beams, and which detect displacements of the vibrating beams in a direction perpendicular to the vibrating direction of the vibrating beams.

The gyroscope of the present invention is assumed to be the lateral direction driving type. In addition, similar to the conventional type, the principle for driving the vibrating beams is based on an electrostatic attraction force. In the conventional gyroscope, vibrating beams (which corresponds to the above-described tines) of the tuning fork are driven by using attraction forces applied to the opposing surfaces of the vibrating beams and the drive electrodes. In contrast, in the gyroscope according to the present invention, the drive electrodes are disposed in such a manner that the parts thereof oppose the vibrating beams of the tuning fork and the remaining parts thereof protrude from the vibrating beams. Thus, when a voltage is applied between the vibrating beams and the drive electrodes, the vibrating beams are driven by forces applied in directions in which the opposing areas between the vibrating beams and the drive electrodes are increased.

In order to describe this more specifically, with reference to FIG. 11, a case is considered in which a vibrating beam and a drive electrode have surfaces which are shifted relative to each other in the horizontal direction (in FIG. 11) and which include opposing parts 1 and 2. When the size of the surfaces in the direction perpendicular to the shifting direction thereof is g and the distance between the surfaces is d, the electrostatic attraction force F applied in a direction in which the area of the opposing parts 1 and 2 is increased can be calculated as the following.

$$F=(1/2)\cdot\epsilon_0(g/d)V^2 \qquad (1)$$

wherein $\epsilon_0$ is the dielectric constant in vacuum, and V is an applied voltage.

Due to the force F calculated by equation (1), the vibrating beams vibrate in the direction parallel to the substrates on which the drive electrodes are provided (in the lateral direction). In the construction according to the present invention, the above-described size g can be increased in the longitudinal direction of the vibrating beams, so that a large driving force can be obtained. Conversely, the driving voltage for obtaining a predetermined driving force can be reduced. In the above-described construction, the drive electrodes are provided on each of the substrates disposed at both sides of the vibrating beams. When a voltage is applied between the vibrating beams and the drive electrodes, the vibrating beams receive not only the forces in the direction parallel to the substrates but also the forces in the direction perpendicular to the substrates. More specifically, with respect to FIG. 11, a force in the direction perpendicular to the opposing parts 1 and 2 (attraction force) will also occur in addition to a force in the direction parallel to the opposing parts 1 and 2 (in a direction in which the opposing area is increased). Thus, if the drive electrodes are provided at only one side of the vibrating cantilevers, the vibrating cantilever also vibrates in the direction perpendicular to the substrates (in the thickness direction).

The principle for detection is the same as that in the conventional type, in which the vibrations of the vibrating beams of the tuning fork are detected by variations of the electrostatic capacitances. More specifically, the variations of electrostatic capacitances, which occur when the vibrating beams are vibrated in the thickness direction due to Coriolis force and distances between the vibrating beams and the detection electrodes vary, are detected. The Q value of the detected vibration (vibration in the thickness direction) may be controlled by controlling the distances between the vibrating beams and the detection electrodes. Accordingly, the Q value of the generated vibration may be sufficiently increased, and the Q value of the detected vibration may be reduced to an adequate value. As a result, by increasing the Q value of the generated vibration and by reducing the Q value of the detected vibration, a broad detection characteristic may be obtained. Thus, a device in which vibrations of large degree are generated and which has stable detection sensitivity may be realized.

According to the gyroscope constructed as described above, when an angular velocity about an axis parallel to the longitudinal direction of the vibrating beams is input while they vibrate in the lateral direction, vibrations thereof in the thickness direction also occur due to Coriolis force. Since the vibrating beams and the detection electrodes are capacitively coupled, the electrostatic capacitances vary with the variations in the distances between the vibrating beams and the detection electrodes. Accordingly, the input angular velocity may be determined by detecting the variation of capacitances.

As described above, in the gyroscope having the above-described construction in which the vibrating beams are sandwiched and supported by the substrates from both sides thereof, the drive electrodes may be provided on the substrates in such a manner that the parts thereof oppose the vibrating beams. Thus, it is not necessary to dispose the drive electrodes between the tines and outside the tines as in the conventional type. Therefore, the gap between the tines may be reduced to, for example, a limit determined by silicon processes, and the Q value may be sufficiently increased. As a result, the driving voltage may be reduced, and, of course, the size of the device may be reduced.

Each of the substrates may be provided with a plurality of drive electrodes. In such a case, the drive electrodes are preferably disposed at both sides of central lines of the vibrating beams which are parallel to the longitudinal direction thereof.

By disposing the drive electrodes at both sides of the central lines of the vibrating beams which are parallel the longitudinal direction thereof and by alternately applying voltage to the drive electrodes, a vibration mode which is more stable may be easily realized. In addition, in a case in which the vibrating beams are vibrated across the central lines thereof, the drive electrodes are preferably disposed at symmetrically about the central lines so that the amplitudes of both sides of the central line become the same. However, the drive electrodes are not necessarily disposed symmetrically, as long as vibrations symmetrical across the central lines are realized.

In addition, the detection electrodes are provided on at least one of the pair of substrates. The vibrations of the vibrating beams in the direction perpendicular to the substrates may be detected in terms of variations of electrostatic capacitances between the vibrating beams and the detection electrodes. In addition, when the detection electrodes are provided on both of the substrates, the effect of noise may be reduced by performing the detection from both sides.

In addition, according to another aspect of the present invention, a gyroscope includes a tuning fork having vibrating beams; at least one substrate which is disposed at at least one side of the tuning fork, and which is insulative at at least the surface thereof; drive electrodes which are disposed in such a manner that parts of the drive electrodes oppose the end surfaces of the vibrating beams in the longitudinal direction thereof and the remaining parts of the drive electrodes protrude from the end surfaces of the vibrating beams, the drive electrodes being capacitively coupled to the vibrating beams and driving the vibrating beams in a direction parallel to the substrate; and detection electrodes which are capacitively coupled to the vibrating beams, and which detect displacements of the vibrating beams in a direction perpendicular to the vibrating direction of the vibrating beams.

In this gyroscope, instead of providing the drive electrodes on the substrates disposed at both sides of the vibrating beam, the drive electrodes are disposed in such a manner that parts of the drive electrodes oppose the end surfaces of the vibrating beams in the longitudinal direction thereof. Also in such a construction, when a voltage is applied between vibrating beams and the drive electrodes, the vibrating beams are vibrated in the lateral direction by electrostatic attraction forces applied in directions in which the opposing areas between the vibrating beams and the drive electrodes are increased. In addition, when the drive electrodes are disposed as described above, the vibrations of the vibrating beams in the direction perpendicular to the substrate does not occur while the vibrating beams are driven. Thus, the tuning fork is not necessarily provided with the substrates at both sides thereof as long as it is provided with the substrate at at least one side thereof.

Also in this gyroscope, each of the substrates may be provided with a plurality of drive electrodes. In such a case, the drive electrodes are preferably disposed at both sides of central lines of the vibrating beams which are parallel to the longitudinal direction thereof. In addition, the detection electrodes may be provided on the substrate.

In addition, according to another aspect of the present invention, an input device includes the gyroscope according to either one of the above-described aspects of the present invention. By using the gyroscope according to either one of the above-described aspects of the present invention, small devices such as coordinate input devices for personal computers may be realized.

DESCRIPTION OF THE PREFERRED EMBODIMENTS

First Embodiment

A first embodiment of the present invention will be described below with reference to FIGS. 1 to 5D.

Figure 1:
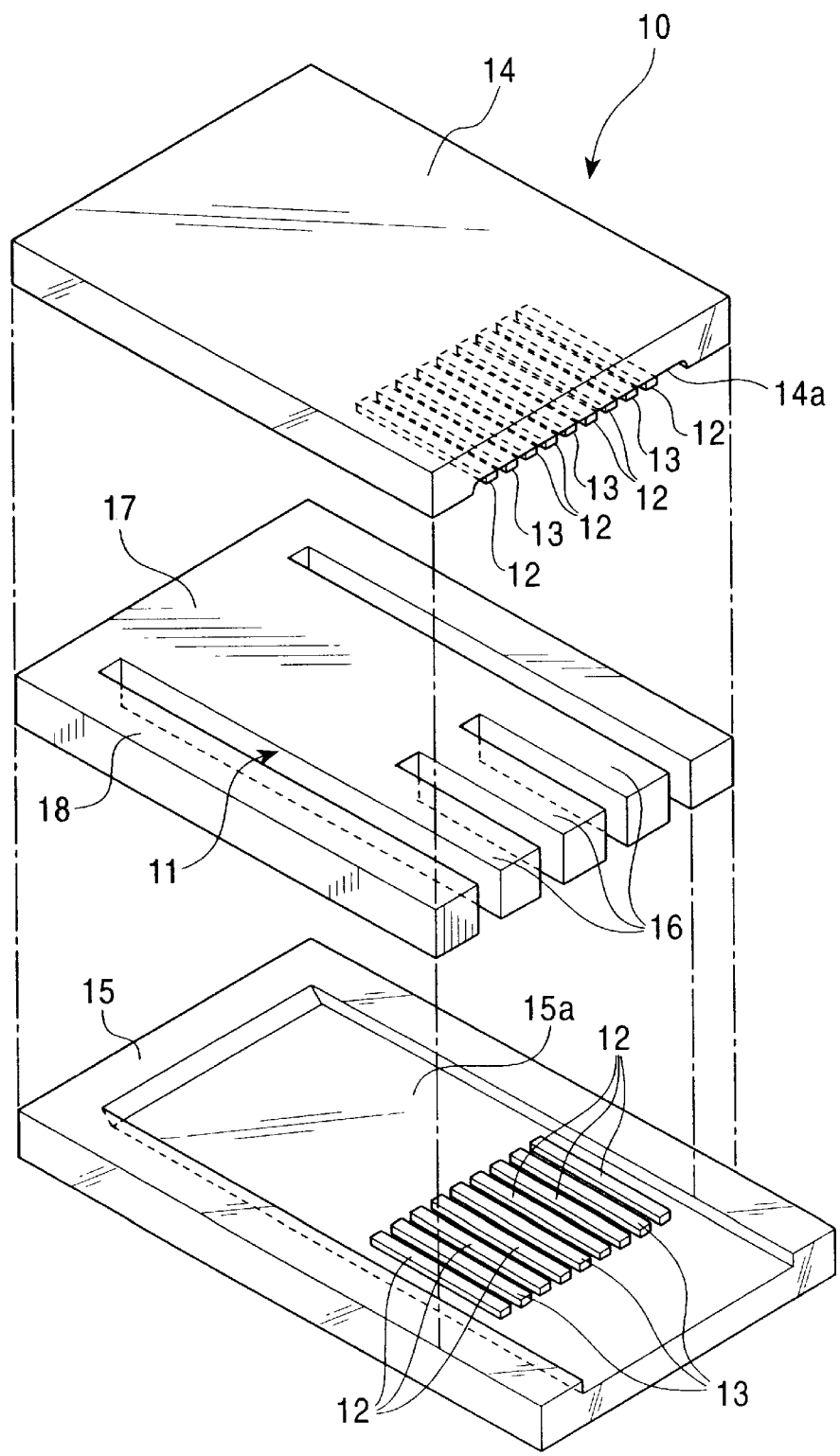
FIG. 1 is an exploded perspective view of a gyroscope according to a first embodiment of the present invention.
Figure 2:
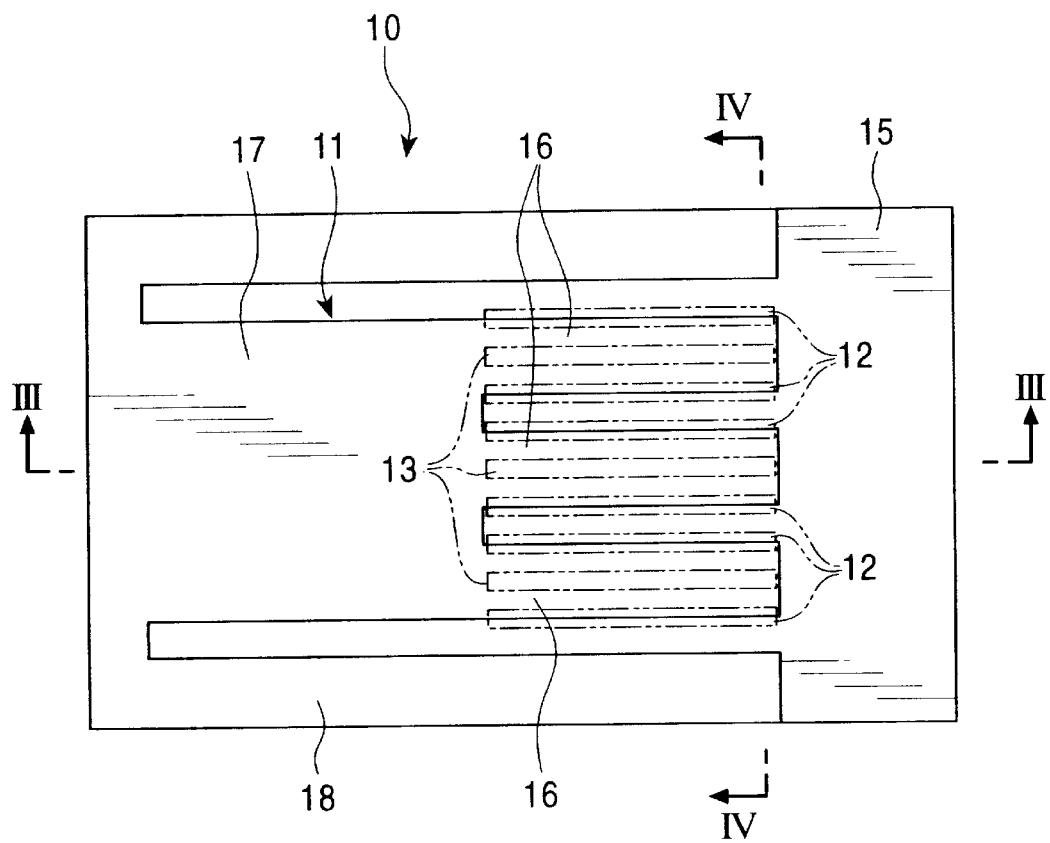
FIG. 2 is a plan view of a gyroscope according to the first embodiment.
Figure 3:
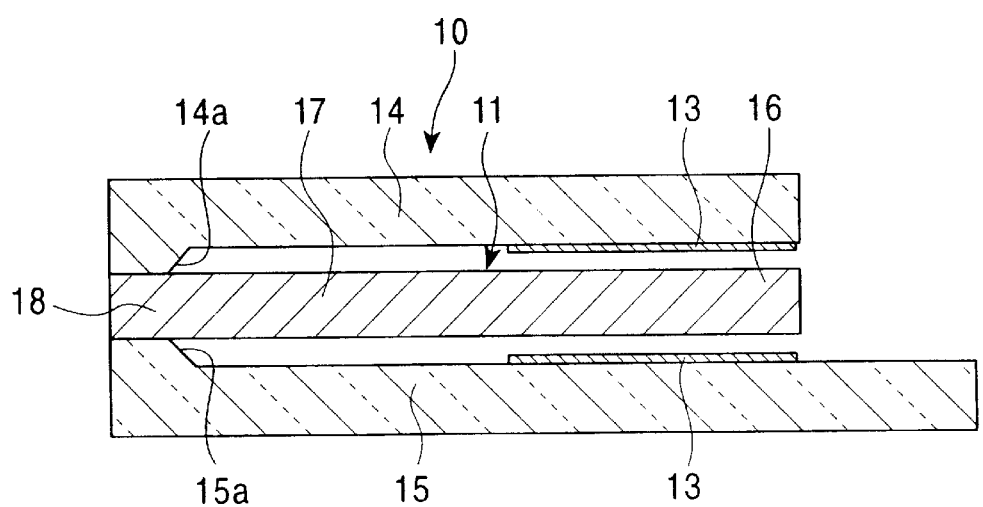
FIG. 3 is a sectional view of FIG. 2 which is cut along line III—III.
Figure 4:
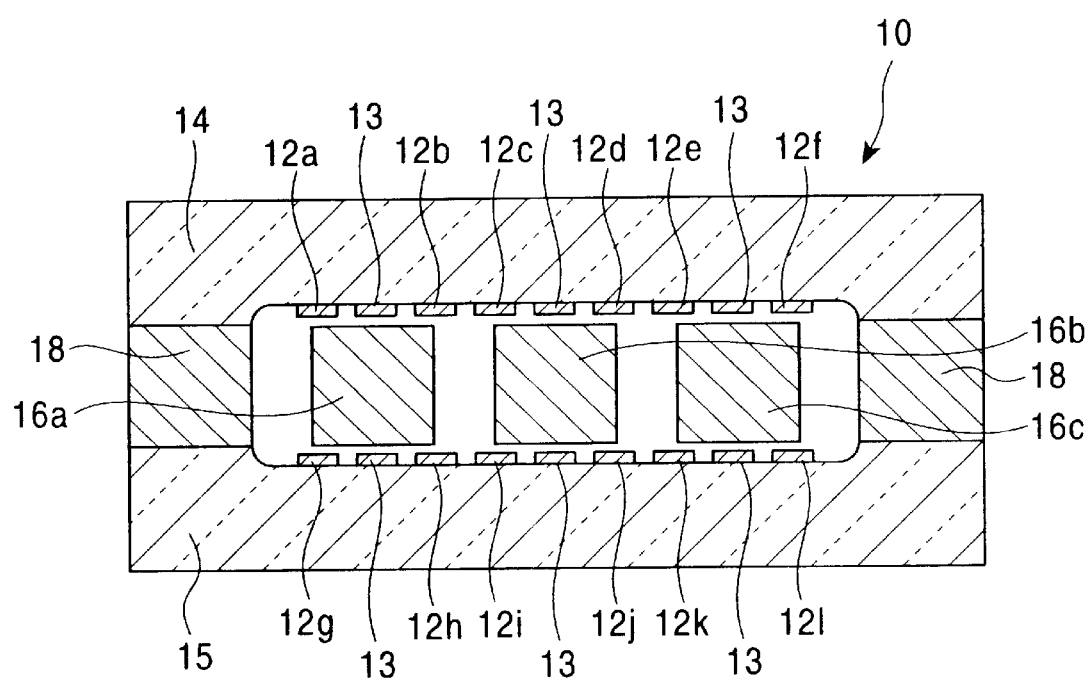
FIG. 4 is a sectional view of FIG. 2 which is cut along line IV—IV.

FIG. 1 is an exploded perspective view of an entire body of a gyroscope according to the first embodiment. FIG. 2 is a plan view of the gyroscope, showing a construction in which components are joined. FIG. 3 is a sectional view of FIG. 2 which is cut along line III—III, and FIG. 4 is a sectional view of FIG. 2 which is cut along line IV—IV. FIGS. 5A to 5D are sectional views showing a manufacturing process for the gyroscope.

With respect to reference numerals, 11 indicates a tuning fork, 12 indicates drive electrodes, 13 indicates detection electrodes, 14 indicates an upper glass substrate (base member), 15 indicates lower glass substrate (base member).

In order to simplify the figures, some components are omitted in some of the figures.

As shown in FIGS. 1 and 2, the gyroscope 10 of the first embodiment includes the tuning fork 11 having three tines (vibrating beams) 16 and a supporting portion 17 which connects the base ends of the three tines 16. In addition, a frame portion 18 is provided around the tuning fork 11. The tuning fork 11 and the frame portion 18 are integrally formed of a p-type silicon substrate having a width of approximately 200 μm. As shown in FIGS. 3 and 4, the frame portion 18 is sandwiched and is fixed between the upper glass substrate 14 and the lower glass substrate 15. In the two glass substrates 14 and 15, concavities 14a and 15a having a depth of, for example, 10 μm, are formed at regions above and below the tuning fork 11. Accordingly, the tines 16 of the tuning fork 11 are able to vibrate inside the gaps of approximately 10 μm provided between the upper glass substrate 14 and the tuning fork 11 and between the lower glass substrate 15 and the tuning fork 11.

As shown in FIGS. 1 to 4, the bottom surface of the upper glass substrate 14 is provided with electrodes which are arranged at positions corresponding to the tines 16 in a manner parallel to the tines 16. Three electrodes are provided for each of the tines 16, and nine electrodes in total are provided. Of the three electrodes provided for each tine 16, two electrodes are disposed at either side in such a manner that a part of the electrode opposes the top surface of the tine 16, and the remaining part protrudes therefrom. These pairs of electrodes serve as drive electrodes 12. The entire surface of the other electrode, which is disposed in the middle, opposes the tine 16. This electrode serves as the detection electrode 13. Similarly, on the top surface of the lower glass substrate 15, two drive electrodes 12 and a detection electrode 13 are provided for each of the tines 16. In addition, the pairs of drive electrodes 12, which are provided on each of the glass substrate 14 and 15 and which correspond to each of the tines 16, are disposed symmetrically about the central line of the tine 16 in the longitudinal direction thereof.

The drive electrodes 12 and the detection electrodes 13 are constructed by forming, on the bottom surface of the upper glass substrate 14 and on the top surface of the lower glass substrate 15, an aluminum or chromium film approximately 100 nm thick, or a film approximately 100 nm thick formed by laminating an approximately 70 nm thick platinum film on an approximately 30 nm thick titanium film (the combination of which will be referred to as platinum-titanium film in the following descriptions). Although not shown in the figure, the drive electrodes 12 and the detection electrodes 13 are provided with electric lines, terminals, etc., for applying and receiving a voltage.

In addition, in practice, the bottom surface of the upper glass substrate 14 and the top surface of the lower glass substrate 15 are provided with equipotential patterns at regions in which the drive electrodes 12 and the detection electrode 13 are not formed. However, since the equipotential patterns are not related to the function of the gyroscope 10, and are merely required in the manufacturing process thereof, they are not shown in the figure. The equipotential patterns are formed of the same material as the material with which the drive electrodes 12 and the detection electrode 13 are formed, for example, an aluminum film, a chromium film, a platinum-titanium film, etc.

An example of a manufacturing process for the gyroscope 10, which is constructed as described above, will be described with reference to FIGS. 5A to 5D. FIGS. 5A to 5D are sectional views which are cut at the same position as FIG. 3, which is the sectional view of FIG. 2 along line III—III.

Figure 5A:
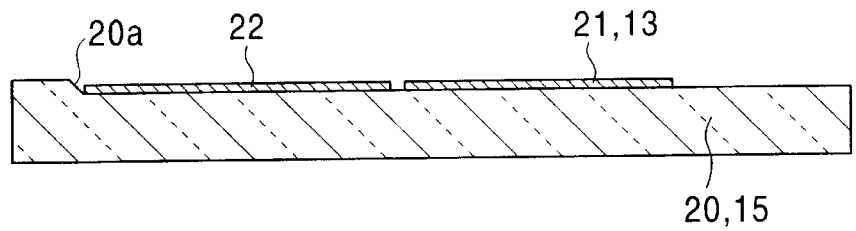
FIGS. 5A to 5D are sectional views showing a manufacturing process for the gyroscope according to the first embodiment.

As shown in FIG. 5A, a glass substrate 20 is prepared, and a chromium film (not shown) is formed on the surface of the glass substrate 20 by sputtering, etc. Then, a resist pattern (not shown) is formed and the chromium film is etched by using the resist pattern as a mask. Then, the surface of the glass substrate 20 is etched using hydrofluoric acid, and by using the resist and the chromium film as a mask. Accordingly, a concavity 20a, the depth of which is approximately 10 $\mu$m, is formed in the glass substrate 20 at the region corresponding to the tuning fork 11. Then, the resist pattern and the chromium pattern are removed.

Next, a metal film 21 approximately 100 nm thick, which is an aluminum film, a chromium film, a platinum-titanium film, etc., is formed on the entire surface of the substrate by sputtering, etc. Then, the drive electrodes 12, the detection electrodes 13, and the equipotential patterns 22 are formed by patterning the film, by using well-known photolithography techniques. Accordingly, the lower glass substrate 15 is completed. The upper glass substrate 14 is also prepared by similar processes.

Figure 5B:
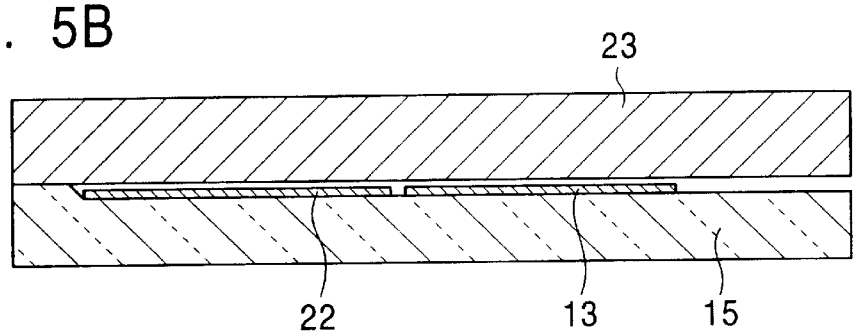

Next, as shown in FIG. 5B, a silicon substrate 23 is prepared, and the bottom surface of the silicon substrate 23 is bonded to the lower glass substrate 15 by an anode coupling method. At this time, only the region corresponding to the frame portion 18 is bonded. In the anode coupling method, a silicon substrate and a glass substrate are bonded to each other by applying a positive potential to the silicon substrate and by applying a negative potential to the glass substrate. However, the gap between the silicon substrate 23 and the surface of the lower glass substrate 15 is only 10 $\mu$m at the region corresponding to the tuning fork 11. Thus, when the silicon substrate 23 is pulled and is bent due to the electrostatic force which is generated during the anode coupling process, and comes into contact with the lower glass substrate 15, the region corresponding to the tuning fork 11 may also be bonded to the lower glass substrate 15. In such a case, it is not possible to form the tuning fork 11 having tines which are able to vibrate. Accordingly, in order to prevent this generation of electrostatic force, the equipotential pattern 22 is used for equalizing the potentials of the lower glass substrate 15 and of the silicon substrate 23.

Figure 5C:
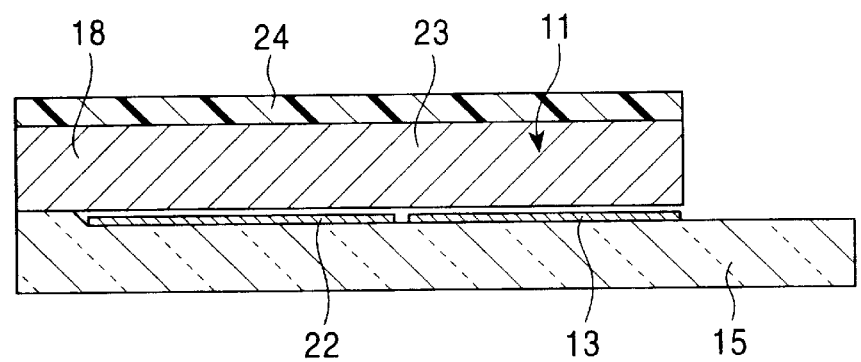

Next, as shown in FIG. 5C, a resist pattern 24 is formed on the silicon substrate 23. The resist pattern 24, when seen from the top, has the same shape as that shown in FIG. 2 including the tuning fork 11, the frame portion 18, etc., that is, the shape of the remaining part of the silicon. The silicon substrate 23 is etched through by a reactive ion etching method, by using the resist pattern 24 as a mask. Accordingly, the tuning fork 11 is formed in such a manner that the tuning fork 11 is held above the lower glass substrate 15, and the frame portion 18 is also formed.

Figure 5D:
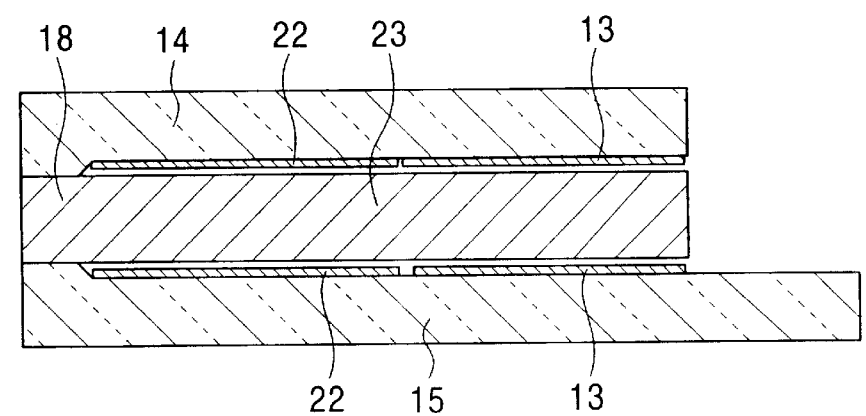

Next, as shown in FIG. 5D, the upper surface of the silicon substrate 23 is bonded to the upper glass substrate 14 by the anode coupling method. In this process, the frame portion 18 in the silicon substrate 23 is bonded on the upper glass substrate 14. Accordingly, the gyroscope 10 of the first embodiment is completed.

When the gyroscope 10 of the first embodiment is used, an oscillator is connected to the drive electrodes 12 and capacitance detectors are connected to the detection electrodes 13. In addition, the tuning fork 11 is grounded. Then, the oscillator applies a voltage of a frequency of several kHZ to the drive electrodes 12. With reference to FIG. 4, when the drive electrodes 12a, 12d, 12e, 12g, 12j, and 12k of the twelve drive electrodes 12 receive the voltage at the same time, electrostatic attraction forces are applied in directions in which the overlapping areas between drive electrodes 12a and 12g and tine 16a, drive electrodes 12d and 12j and tine 16b, and drive electrodes 12e and 12k and tine 16c are increased. Thus, the tines 16a and 16c move to the left in the figure, and the tine 16b moves to the right in the figure. Subsequently, when the drive electrodes 12b, 12c, 12f, 12h, 12i, and 12l receive the voltage at the same time, the tines 16a and 16c move to the right, and the tine 16b moves to the left. Accordingly, the tines 16 of the tuning fork 11 are vibrated in the lateral direction, and the vibration mode of a three-tine type tuning fork is realized. Different from FIGS. 1 to 3, reference numerals are individually attached to the drive electrodes in FIG. 4 in order to simplify the explanation.

When the tines 16 receive an angular velocity about an axis parallel to the longitudinal direction thereof, vibration in the thickness direction occurs due to Coriolis force in accordance with the angular velocity applied. At this time, the upper and the lower surfaces of the tines 16 of the tuning fork 11 oppose the detection electrodes 13, and the gaps between the upper and the lower surfaces of the tines 16 and the detection electrodes 13 vary due to the vibration of the tines 16. Thus, variations of capacitances occur. Accordingly, the angular velocity can be determined by detecting the variations of capacitances.

Accordingly, in the gyroscope 10 of the first embodiment, it is not necessary to provide detection electrodes between the tines as in the conventional type. Thus, the gaps between the tines can be reduced to a limit determined by silicon processes, for example, to approximately 10 $\mu$m, and the Q value can be increased. Since the Q value can be increased, the driving voltage of the device as an angular velocity sensor can be reduced. In addition, the size of the device can be reduced.

In addition, in the gyroscope 10 of the first embodiment, the tuning fork 11 is sandwiched by the glass substrates 14 and 15. Thus, the tuning fork 11 is protected by the glass substrates 14 and 15, and the device can be handled easily. In addition, since the construction the device is such that dust cannot easily enter, disturbance is suppressed, and the accuracy of the sensor is improved. In addition, in the construction described above, vacuum sealing is easily performed. In such a case, the Q value can be increased even more.

In addition, in the first embodiment, the pairs of drive electrodes 12, which are provided on each of the glass substrates 14 and 15 and which correspond to each of the tines 16, are disposed at symmetrically about the central line of the tine 16 in the longitudinal direction thereof. Accordingly, vibrations in which amplitudes of both sides of the central line are the same are easily generated.

Figure 6:
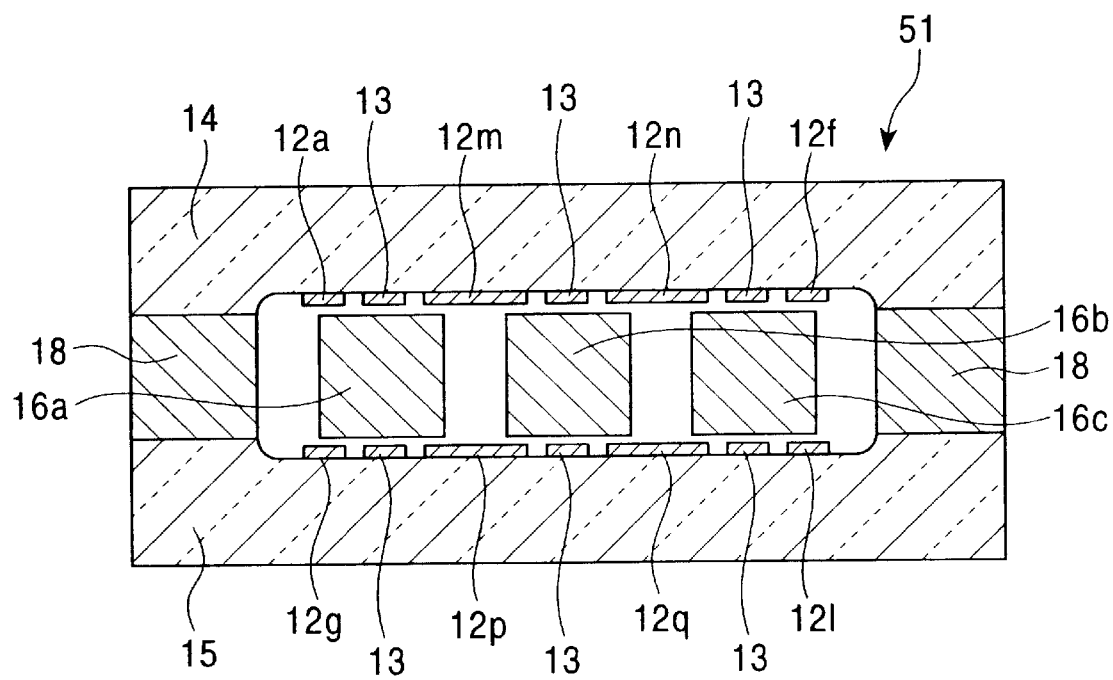
FIG. 6 is a sectional view showing a modification of the gyroscope according to the first embodiment.

In contrast, each pair of the drive electrodes 12b and 12c, 12d and 12e, 12h and 12i, and 12j and 12k shown in FIG. 4 may be integrally formed. More specifically, as shown in FIG. 6, a drive electrode 12m, which is common to tines 16a and 16b, and a drive electrode 12n, which is common to the tines 16*b* and 16*c*, may be provided on the bottom surface of the upper glass substrate 14. Similarly, a drive electrode 12*p*, which is common to tines 16*a* and 16*b*, and a drive electrode 12*q*, which is common to the tines 16*b* and 16*c*, may be provided on the top surface of the lower glass substrate 14. In FIG. 6, components which are the same as those shown in FIG. 4 are denoted by the same reference numerals.

In the gyroscope 10 shown in FIG. 4, each pair of the drive electrodes 12*b* and 12*c*, 12*d* and 12*e*, 12*h* and 12*i*, and 12*j* and 12*k* always receives the voltage (the driving voltage of the same phase) at the same time. Accordingly, also in the gyroscope 51 shown in FIG. 6, in which the drive electrodes 12*m*, 12*n*, 12*p*, and 12*q* are formed by joining the above-described pairs, a vibration mode of the three-tine type tuning fork is realized without causing any operational problems. In this gyroscope 51, the drive electrodes positioned across the central line of the tine, for example, the drive electrodes 12*a* and 12*m* and the drive electrodes 12*q* and 12*p*, which are positioned across the central line of the tine 16*a*, do not have shapes symmetrical to each other. However, construction of the device is made simpler.

Second Embodiment

A second embodiment of the present invention will be described below with reference to FIGS. 7 to 10.

Figure 7:
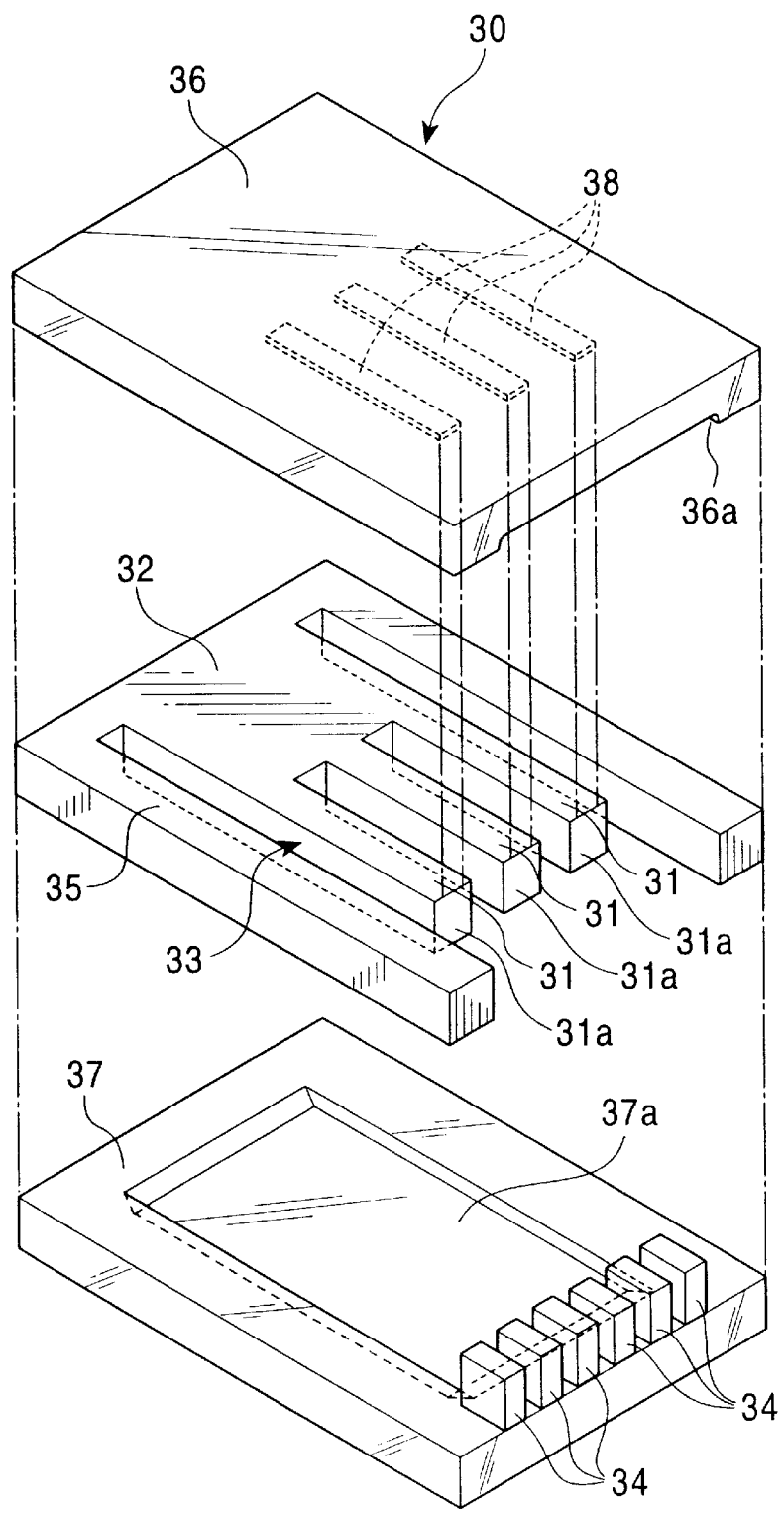
FIG. 7 is an exploded perspective view of a gyroscope according to a second embodiment of the present invention.
Figure 8:
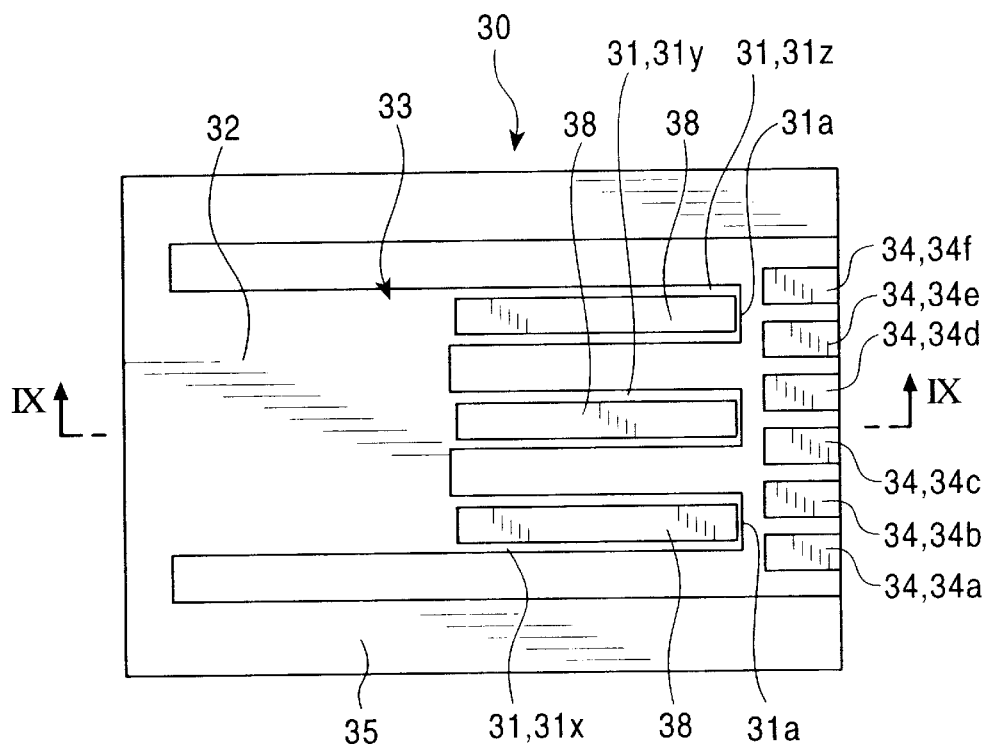
FIG. 8 is a plan view of the gyroscope according to the second embodiment.
Figure 9:
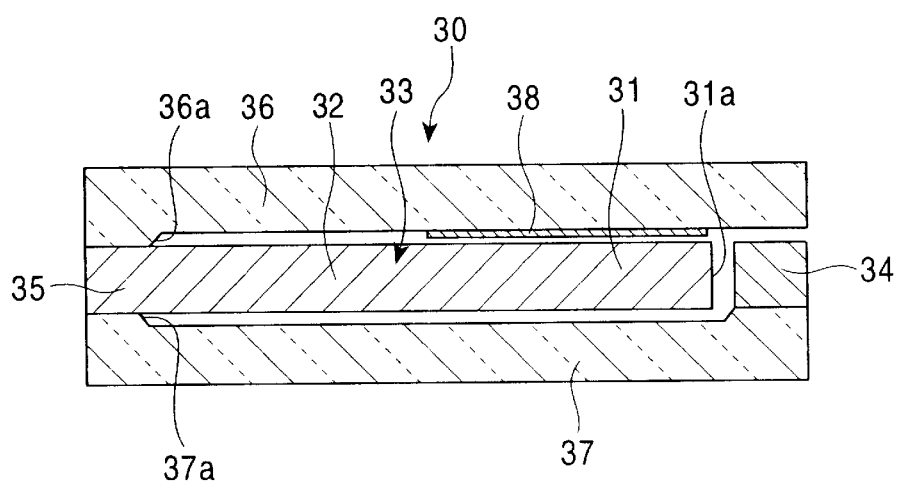
FIG. 9 is a sectional view of FIG. 8 which is cut along line IX—IX.

FIG. 7 is an exploded perspective view of an entire body of a gyroscope according to the second embodiment. FIG. 8 is a plan view of the gyroscope, showing a construction in which components are joined. FIG. 9 is a sectional view of FIG. 8 which is cut along line IX—IX, and FIGS. 10A to 10D are sectional views showing a manufacturing process of the gyroscope.

In the gyroscope of the first embodiment, the drive electrodes are disposed in a manner such that parts thereof oppose the upper and the bottom surfaces of the tines. In contrast, in the second embodiment, the drive electrodes oppose the end surfaces of the tines.

As shown in FIGS. 7 and 8, similar to the gyroscope according to the first embodiment, a gyroscope 30 of the second embodiment includes a tuning fork 33 having three tines (vibrating beams) 31 and a supporting portion 32 which connects the base ends of the three tines 31. In addition, two drive electrodes 34 are provided for each of the tines 31, and six drive electrodes 34 in total are disposed in such a manner that the drive electrodes 34 oppose the end surfaces 31*a* of the tines 31 in the longitudinal direction thereof. As shown in FIG. 8, two drive electrodes 34, which are provided for each tine 31, are disposed symmetrically about the central line of the tine 31 in the longitudinal direction in such a manner that parts thereof protrude from the tine 31. In addition a frame portion 35 is provided around the tuning fork 33. The tuning fork 33 and the frame portion 35 are integrally formed of a conductive silicon substrate.

As shown in FIGS. 7 and 9, the frame portion 35 is sandwiched and is fixed between an upper glass substrate (base member) 36 and a lower glass substrate (base member) 37. In the inwardly facing surfaces of the glass substrates 36 and 37, concavities 36*a* and 37*a* having a depth of, for example, 10 $\mu$m, are formed at regions above and below the tuning fork 33. Accordingly, the tines 31 of the tuning fork 33 are able to vibrate inside the gaps of approximately 10 $\mu$m provided between the upper glass substrate 36 and the tuning fork 33 and between the lower glass substrate 37 and the tuning fork 33. In addition, the above-described six drive electrodes 34 are fixed on the top surface of the lower glass substrate 37.

As shown in FIGS. 7 and 8, one detection electrode 38 is provided with respect to each tine 31 of the tuning fork 33, and three detection electrodes 38 in total are provided. The detection electrodes 38 are formed of an aluminum film, a chromium film, a platinum/titanium film, etc. approximately 300 nm thick, and are provided on the bottom surface of the upper glass substrate 36 in such a manner that the detection electrodes 38 oppose the tines 31 as shown in FIG. 9. As shown in FIG. 8, the width of the detection electrodes 38 is less than the width of the tines 31. Although not shown in the figures, the drive electrodes 34 and the detection electrodes 38 are provided with electric lines, terminals, etc., for applying or drawing out a voltage. In addition, equipotential patterns similar to the first embodiment are also provided.

Figure 10A:
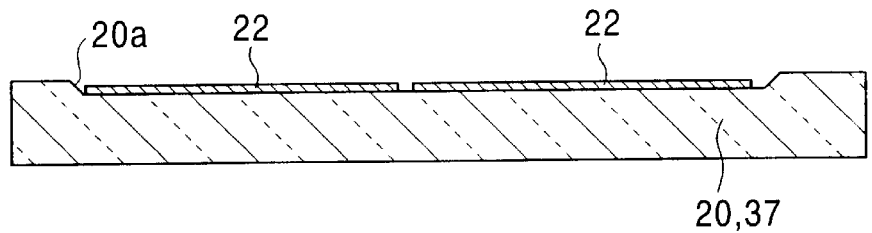
FIGS. 10A to 10D are sectional views showing a manufacturing process for the gyroscope according to the second embodiment.

An example of a manufacturing process for the gyroscope 30 of the second embodiment will be described below. As shown in FIG. 10A, a glass substrate 20 is prepared, and a concavity 20*a* having a depth of approximately 10 $\mu$m is formed at the region corresponding to the tuning fork 33 by using a technique similar to that described in the first embodiment. In the second embodiment, however, the region corresponding to the drive electrodes 34 is not etched in order to bond a silicon substrate thereon. Then, a film constructed of an aluminum film, a chromium film, a platinum/titanium film, etc., having a thickness of approximately 300 nm is formed. Then, the equipotential patterns are formed by patterning the film, by using well-known photolithography techniques. Accordingly, the lower glass substrate 37 is completed. At the same time, the detection electrodes 38 are formed on a glass substrate which forms the upper glass substrate 36 by patterning an aluminum film, a chromium film, a platinum/titanium film, etc.

Figure 10B:
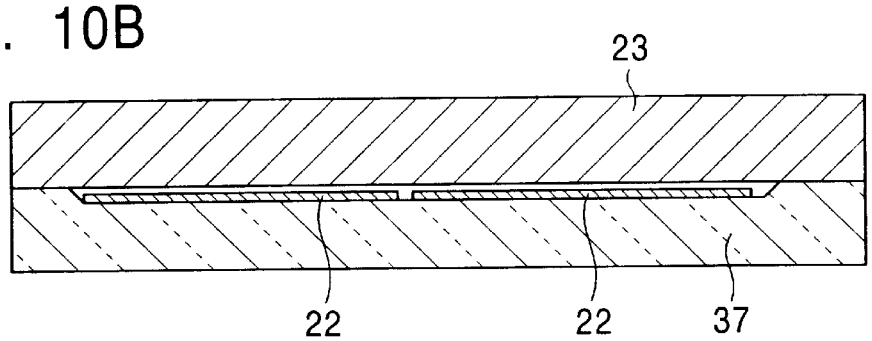

Next, as shown in FIG. 10B, a silicon substrate 23 is prepared, and the bottom surface of the silicon substrate 23 is bonded to the lower glass substrate 37 by the anode coupling method. Accordingly, in the silicon substrate 23, regions corresponding to the frame portion 35 and drive electrodes 34 are bonded to the lower glass substrate 37.

Figure 10C:
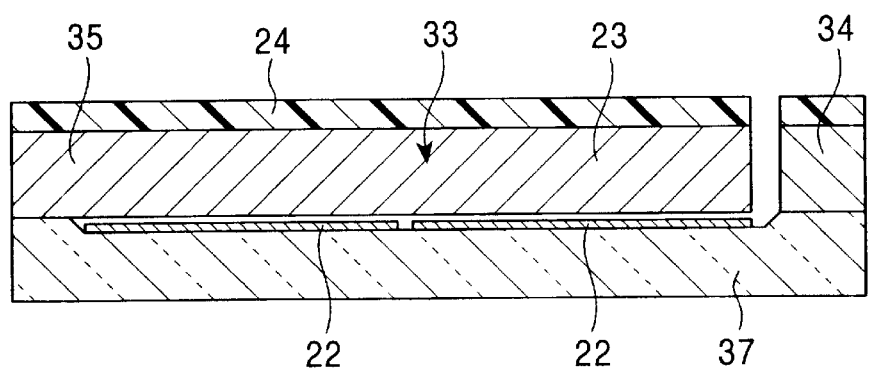

Next, as shown in FIG. 10C, a resist pattern 24 is formed on the silicon substrate 23. The resist pattern 24, when seen from the top, has the same shape as that shown in FIG. 8 including the tuning fork 33, the frame portion 35, the drive electrodes 34, etc., that is, the shape of the remaining part of the silicon. The silicon substrate 32 is etched through by a reactive ion etching method, etc., by using the resist pattern 24 as a mask. Accordingly, the tuning fork 33, the frame portion 35, and the drive electrodes 34 are formed in a manner such that the tuning fork 33 floats above the lower glass substrate 37 and the frame portion 35 and the drive electrodes 34 are fixed thereon. Then, the resist pattern 24 is removed.

Figure 10D:
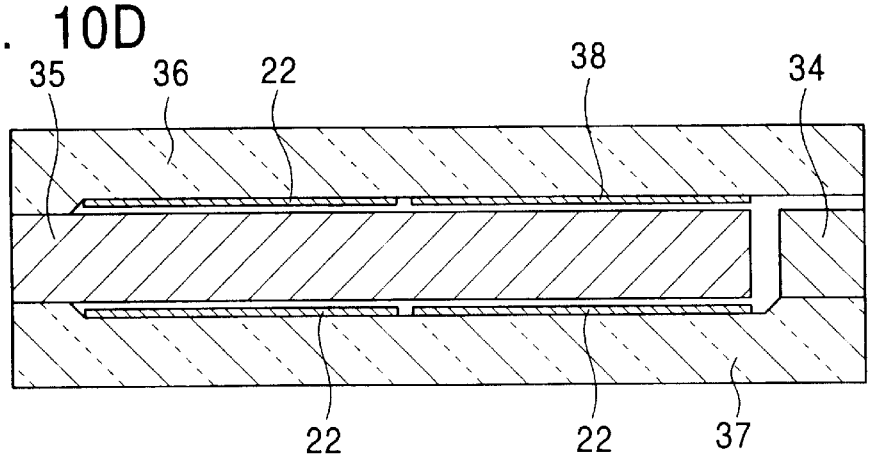
Figure 11:
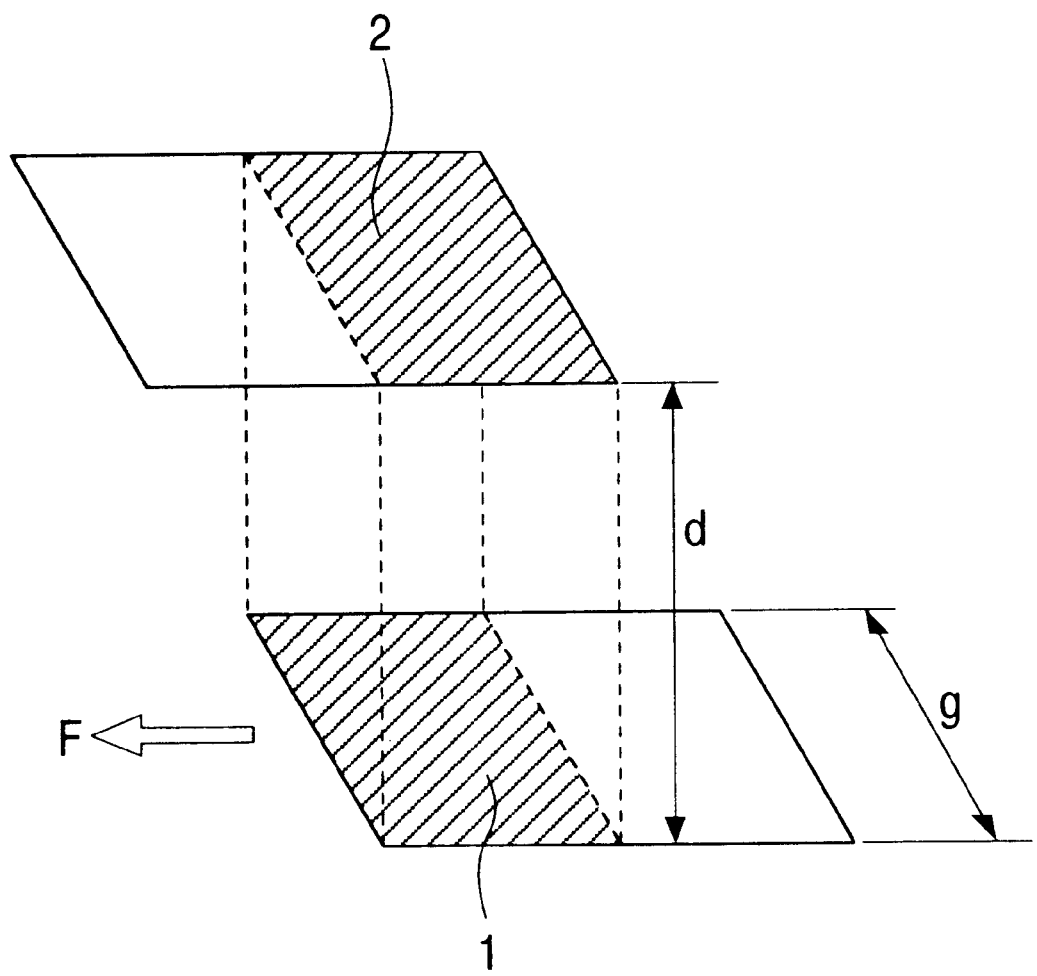
FIG. 11 is an explanatory drawing for explaining principle for driving the gyroscope of the present invention.

Next, as shown in FIG. 10D, the upper surface of the silicon substrate 23 is bonded to the upper glass substrate 36, which is individually prepared, by the anode coupling method. In this process, the frame portion 35 in the silicon substrate 23 is bonded on the upper glass substrate 36. Accordingly, the gyroscope 30 of the second embodiment is completed.

The method for using the gyroscope 30 of the second embodiment is almost the same as that in the first embodiment. The only difference is that the surfaces to which the electrostatic attraction forces are applied in the direction to increase the overlapping areas are the top and the bottom surfaces of the tines in the first embodiment but are the end surfaces 31*a* of the tines 31 in the second embodiment. For example, with reference to FIG. 8, when the drive electrodes 34*a*, 34*d*, and 34*e* of the six drive electrodes 34 receive the voltage at the same time, electrostatic attraction forces are applied in directions in which the opposing areas between the drive electrodes 34a, 34d, and 34e and end surfaces 31a of the tines 31 are increased. Thus, the tines 31x and 31z move downward in FIG. 8, and the tine 31y moves upward in FIG. 8. And when, in the next moment, the drive electrodes 34b, 34c, and 34f receive the voltage at the same time, the tines 31x and 31z move upward in FIG. 8, and the tine 31y move downward in FIG. 8. Accordingly, the tines 31 of the tuning fork 33 are vibrated in the lateral direction, and the vibration mode of the three-tine type tuning fork is achieved.

When the tines 31 receive an angular velocity about an axis parallel to the longitudinal direction thereof, a vibration in the thickness direction occurs due to Coriolis force in accordance with an amount of the input angular velocity. At this time, the upper surfaces of the tines 31 of the tuning fork 33 oppose the detection electrodes 38, and the gaps between the upper surfaces of the tines 31 and the detection electrodes 38 vary due to the vibration of the tines 31. Thus, variations of capacitances result. Accordingly, the angular velocity can be determined by detecting the variation of capacitances. In the second embodiment, the width of the detection electrodes 38 is less than the width of the tines 31. If the width of the detection electrodes 38 is larger than the width of the tines 31, the variations of the opposing areas between the tines 31 and the detection electrodes 38 occur while the tines 31 are vibrated in the lateral direction, thereby causing the variation of capacitances. Thus, the variation of capacitances caused by the vibrations in the thickness direction, which occur when an angular velocity is input, cannot be reliably detected.

As described above, also in the gyroscope 30 of the second embodiment, it is not necessary to provide detection electrodes between the tines. Thus, the gaps between the tines can be reduced and the Q value can be increased. Accordingly, the advantages similar to those obtained by the first embodiment can also be obtained. For example, the driving voltage can be reduced, and the size of the device can be reduced. In addition, similar to the first embodiment, the device can be easily handled because the tuning fork 33 is sandwiched by the glass substrates 36 and 37. In addition, the disturbances are suppressed and the accuracy of the sensor is improved. In addition, the Q value can be increased even more by creating a vacuum sealing.

With respect to the gyroscope 30 constructed as described above, if the tuning fork 33 and the drive electrodes 34 are separately prepared and are fixed on a lower glass substrate, the positioning thereof in the manufacturing process requires large amount of time and high cost is incurred. However, in the manufacturing process of the gyroscope 30 according to the second embodiment, the tuning fork 33 and the drive electrodes 34 are formed by separating the silicon substrate 23 by etching process. Thus, the positioning process becomes unnecessary, and the gyroscope 30 can be manufactured with high processing accuracy.

Third Embodiment

Figure 13:
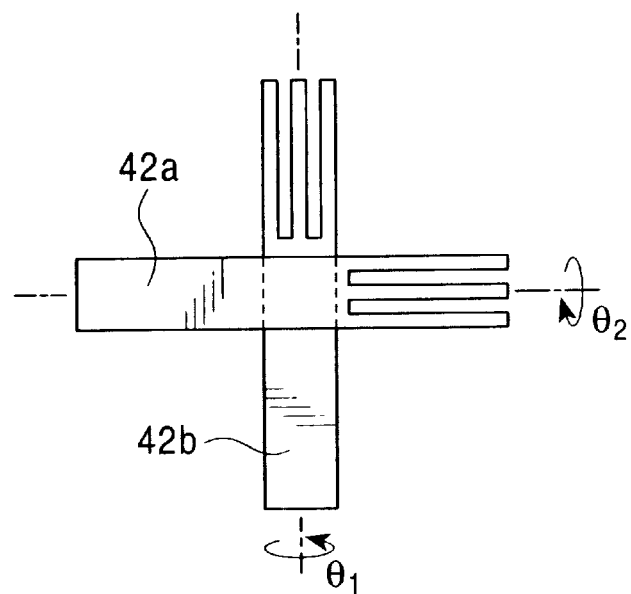
FIG. 13 is a plan view showing two gyroscopes used in the pen-type mouse according to the third embodiment.
Figure 14:
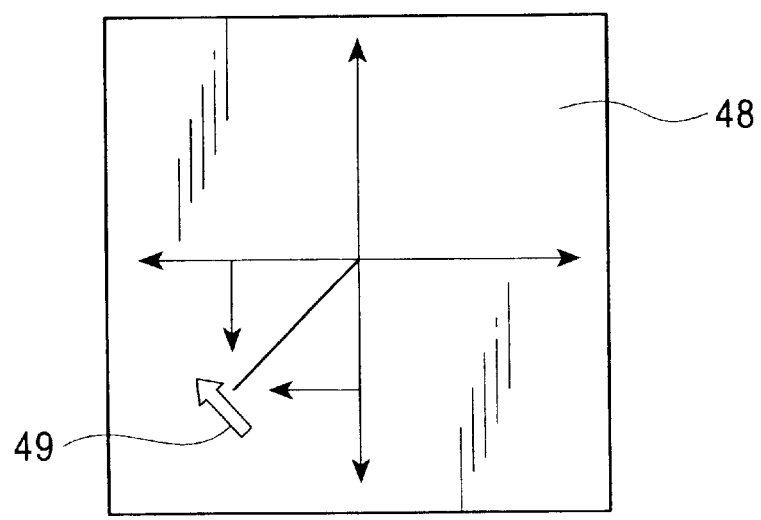
FIG. 14 is a front view of a display of a personal computer on which a movement of the pen-type mouse according to the third embodiment is displayed.
Figure 15:
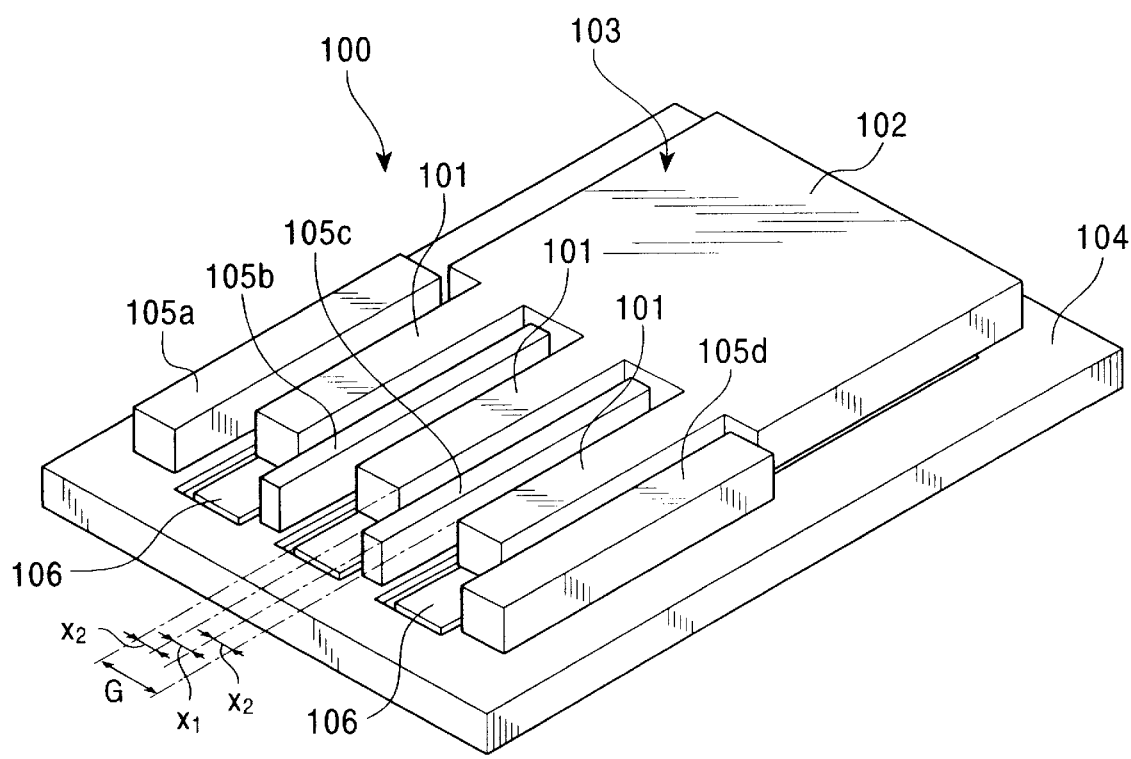
FIG. 15 is a perspective view of a conventional gyroscope.

A third embodiment of the present invention will be described below with reference to FIGS. 12 to 14.

In the third embodiment, an input device using the gyroscope according to the first and the second embodiment will be described. The input device is a pen-type mouse, which is a coordinate-input device of personal computers.

Figure 12:
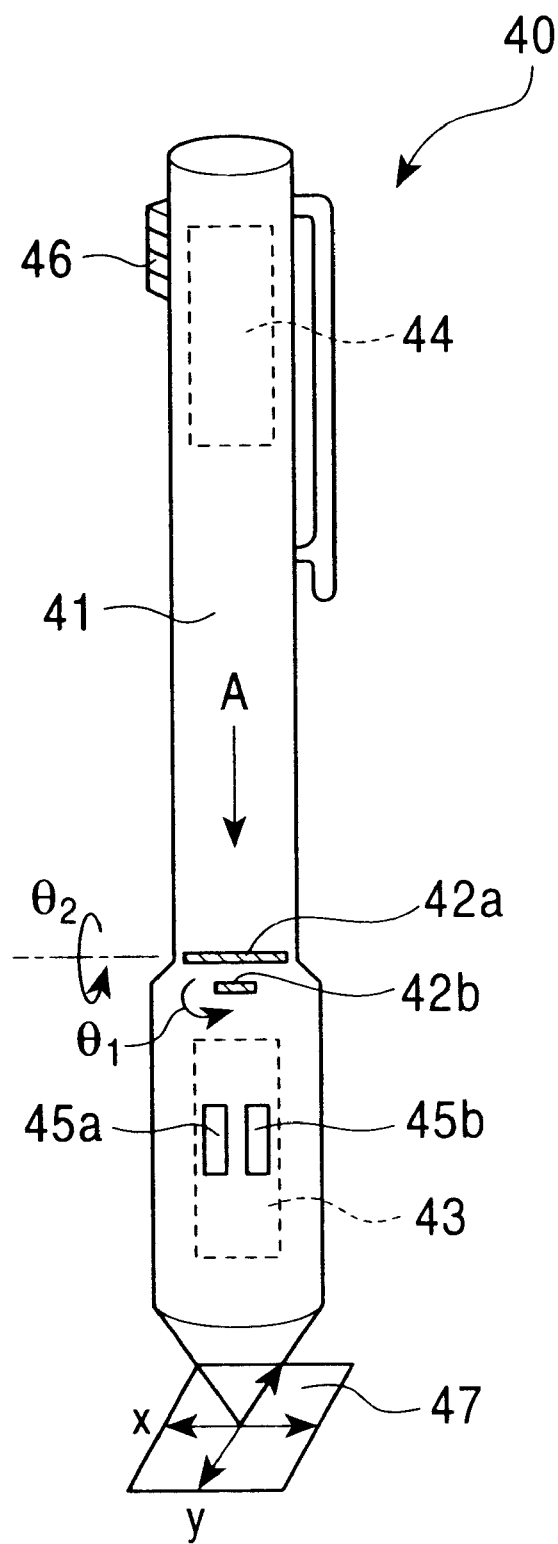
FIG. 12 is a perspective view of a pen-type mouse according to a third embodiment of the present invention.

As shown in FIG. 12, a pen-type mouse 40 according to the third embodiment includes a housing 41 and two gyroscopes 42a and 42b which are contained in the housing 41, and which are constructed as described in the first and the second embodiment. As shown in FIG. 13, the two gyroscopes 42a and 42b are disposed in such a manner that the gyroscopes 42a and 42b, when seen from the top (when seen from the direction shown by arrow A in FIG. 12), perpendicularly cross each other. The pen-type mouse 40 also includes a driving and detection circuit 43 for driving the gyroscopes 42a and 42b and for detecting an angle of rotation. In addition, a battery 44 is contained in the housing 41, and the housing 41 is provided with two switches 45a and 45b, which correspond to switches of a typical mouse, and a switch 46.

When a user holds the pen-type mouse 40 and moves the tip end thereof, a cursor, etc., shown on a display of a personal computer moves in a direction corresponding to the direction in which the tip end is moved. More specifically, with reference to FIG. 12, when the tip end is moved in the X direction on a surface 47, the gyroscope 42b detects the angle of rotation $\theta 1$, and when the tip end is moved in the Y direction on a surface 47, the gyroscopes 42a detects the $\theta 2$. When the tip end is moved in a direction other than the X and Y directions, the angles of rotation $\theta 1$ and $\theta 2$ are detected in combination. The personal computer receives a signal corresponding to the angles of rotation $\theta 1$ and $\theta 2$ from the pen-type mouse 40, and, as shown in FIG. 14, moves the cursor 49 on the display 48 a distance corresponding to the angles of rotation $\theta 1$ and $\theta 2$. Accordingly, the pen-type mouse 40 is able to perform operations similar to that of a typical mouse using an optical encoder, etc.

As described above, the gyroscopes 42a and 42b according to the first and the second embodiment of the present invention are driven with low driving voltage, and have high sensitivity. Thus, the gyroscopes 42a and 42b are suitable for small coordinate input devices such as the pen-type mouse 40 according to the third embodiment. In addition, the gyroscopes 42a and 42b may also be used in other common input devices such as navigation systems, head mount displays, etc., in which an angular velocity must be detected.

The present invention is not limited in the above-described embodiments, and various modifications are possible within the scope of the present invention. For example, in the gyroscope according to the first and the second embodiments, the silicon substrate which forms the tuning fork is sandwiched by the two glass substrates from the upper and lower sides. However, when the anode coupling is performed in a vacuum chamber, the space in which the tuning fork is contained may be sealed under vacuum. In such a case, the Q value may be increased even more, and a device having high efficiency can be obtained.

In the first embodiment, two glass substrates are necessary since the drive electrodes are provided above and below the tuning fork. In the second embodiment, however, instead of sandwiching the silicon substrate forming the tuning fork and the drive electrodes with two glass substrates, the upper glass substrate may be omitted by forming the detection electrodes only on the lower glass substrate. In such a case, the construction of the gyroscope may be made simpler. In addition, although the combination of silicon and glass is preferable in view of anode coupling, the glass substrates may be replaced by an arbitrary material which is coated with a glass by a fusion bonding processing. In addition, carbon may also be used in place of silicon as a material for the tuning fork. In addition, although the tuning forks of the three-tine type are described above, the number of tines is not limited to three. Furthermore, materials of the components, sizes, etc., are not limited to the above-described embodiments, and various modifications are possible in accordance with requirements.

What is claimed is:

1. A gyroscope comprising:

a tuning fork having vibrating beams;

a pair of substrates which are disposed one at each side of said tuning fork, at least surfaces thereof being insulative;

a pair of drive electrodes which are provided on surfaces of said pair of substrates such that said drive electrodes oppose each other, said drive electrodes extending along a longitudinal direction of said vibrating beams such that a portion of each of said drive electrodes opposes one of said vibrating beams and the remaining portion of said drive electrodes protrudes from said one of said vibrating beams, said drive electrodes being capacitively coupled to said vibrating beams and driving said vibrating beams in a direction parallel to said pair of substrates when a voltage is applied to said drive electrodes in the same phase for driving said vibrating beams; and detection electrodes which are capacitively coupled to said vibrating beams, and which detect displacements of said vibrating beams in a direction perpendicular to said substrate and a vibrating direction of said vibrating beams.

2. A gyroscope according to claim 1, wherein each of said substrates is provided with a plurality of pairs of said drive electrodes, and wherein said plurality of pairs of said drive electrodes are disposed at both sides of central lines of said vibrating beams which are parallel to the longitudinal direction thereof.

3. A gyroscope according to claim 1, wherein said detection electrodes are provided on at least one of said pair of substrates.

4. An input device according to claim 2, wherein two drive electrodes and a single detection electrode are provided on each substrate for each vibrating beam, the single detection electrode being provided between the two drive electrodes.

5. An input device according to claim 4, wherein a plurality of vibrating beams are provided and one of the two drive electrodes for one of the vibrating beams is integral with one of the two drive electrodes for another of the vibrating beams.

6. A gyroscope comprising:

a tuning fork having vibrating beams;

at least one substrate which is disposed at at least one side of said tuning fork, and which is insulative at at least a surface thereof;

drive electrodes which are disposed such that a portion of each of said drive electrodes opposes an end surface of one of said vibrating beams in a longitudinal direction thereof and the remaining portion protrudes from the end surface of said one of said vibrating beams, said drive electrodes being capacitively coupled to said vibrating beams and driving said vibrating beams in a direction parallel to said at least one substrate by applying an electrostatic attraction force in a direction to increase opposing areas between the drive electrodes and the end surfaces of said vibrating beams; and detection electrodes which are capacitively coupled to said vibrating beams, and which detect displacements of said vibrating beams in a direction perpendicular to the substrate and to a vibrating direction of said vibrating beams.

7. An input device according to claim 6, wherein, in said gyroscope, said at least one substrate is provided with a plurality of said drive electrodes, wherein said drive electrodes are disposed at both sides of central lines of said vibrating beams which are parallel to a longitudinal direction thereof, and wherein a voltage is alternately applied to said drive electrodes disposed at both sides.

8. A gyroscope according to claim 6, wherein said detection electrodes are provided on a surface of said at least one substrate.

9. An input device comprising a gyroscope according to claim 1.

10. An input device according to claim 9, wherein, in said gyroscope, said at least one substrate is provided with a plurality of said drive electrodes, wherein said drive electrodes are disposed at both sides of central lines of said vibrating beams which are parallel to a longitudinal direction thereof, and wherein a voltage is alternately applied to said drive electrodes disposed at both sides.

11. An input device according to claim 9, wherein, in said gyroscope, said detection electrodes are provided on at least one of said pair of substrates.

12. An input device comprising a gyroscope according to claim 6.

13. An input device according to claim 12, wherein, in said gyroscope, said at least one substrate is provided with a plurality of said drive electrodes, wherein said drive electrodes are disposed at both sides of central lines of said vibrating beams which are parallel to a longitudinal direction thereof, and wherein a voltage is alternately applied to said drive electrodes disposed at both sides.

14. An input device according to claim 12, wherein said detection electrodes are provided on a surface of said at least one substrate.

* * * * *